(12) United States Patent
Lafferty, III et al.

(10) Patent No.: US 8,635,820 B2
(45) Date of Patent: *Jan. 28, 2014

(54) STRUCTURAL REINFORCING SYSTEM COMPONENTS

(71) Applicants: George A. Lafferty, III, Roeland Park, KS (US); Ronald E. Lafferty, Kansas City, KS (US); David C. Mascal, Mission, KS (US)

(72) Inventors: George A. Lafferty, III, Roeland Park, KS (US); Ronald E. Lafferty, Kansas City, KS (US); David C. Mascal, Mission, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,266

(22) Filed: Dec. 10, 2012

(65) Prior Publication Data
US 2013/0097946 A1 Apr. 25, 2013

Related U.S. Application Data

(63) Continuation of application No. 11/500,120, filed on Aug. 7, 2006, now Pat. No. 8,327,592.

(51) Int. Cl.
*E04C 2/52* (2006.01)
*E04C 2/34* (2006.01)
*E02D 27/00* (2006.01)
*E04C 2/32* (2006.01)

(52) U.S. Cl.
USPC ........... 52/293.3; 52/220.2; 52/630; 52/481.1

(58) Field of Classification Search
USPC ............. 52/630, 481.1, 764, 284, 696, 656.1, 52/220.8, 169.7, 169.8, 220.1, 220.2, 52/293.3
See application file for complete search history.

(56) References Cited

U.S. PATENT DOCUMENTS

| | | | | |
|---|---|---|---|---|
| 1,708,394 A * | 4/1929 | Mugler | .......................... | 52/630 |
| 3,055,460 A * | 9/1962 | Maroney | ..................... | 52/293.3 |
| 3,064,770 A * | 11/1962 | Andrews | ........................ | 52/630 |
| 4,603,531 A | 8/1986 | Nash | | |
| 4,650,085 A * | 3/1987 | Davies et al. | ................ | 220/4.02 |
| 4,833,845 A * | 5/1989 | Bruckner et al. | ............ | 52/126.6 |
| 4,862,667 A | 9/1989 | Melland | | |
| 5,729,950 A | 3/1998 | Hardy | | |
| 5,799,462 A | 9/1998 | McKinney | | |
| 5,870,870 A | 2/1999 | Utzman | | |
| 5,927,032 A | 7/1999 | Record | | |
| 6,073,413 A | 6/2000 | Tongiatama | | |
| 6,219,973 B1 | 4/2001 | Lafferty | | |
| 6,374,551 B1 | 4/2002 | Boilen et al. | | |
| 6,418,686 B1 | 7/2002 | Record | | |
| 6,584,740 B2 | 7/2003 | Record | | |
| 6,807,780 B2 | 10/2004 | McCahill et al. | | |
| 6,826,882 B2 | 12/2004 | Lucey et al. | | |
| 6,854,230 B2 | 2/2005 | Starke | | |
| 7,673,422 B2 * | 3/2010 | De La Marche | ............... | 52/79.8 |

(Continued)

*Primary Examiner* — Ryan Kwiecinski
(74) *Attorney, Agent, or Firm* — Erickson Kernell Derusseau & Kleypas, LLC

(57) ABSTRACT

A structural reinforcing panel system for reinforcing a structure against lateral or shear and uplift loads. The system includes a structural reinforcing panel which is installed between the studs in a wall of the structure. The panel is connected to the foundation of the structure and the sill or header. Two or more panels may be connected together at a corner, within a wall, ceiling or floor. The roof rafters of the structure may be attached to a top plate bracket mounted to the sill plate, which may also be connected to one or more structural reinforcing panels, provides uplift load support for the structure. For structures built on piers, a pier mount bracket provides a linkage to one or more structural reinforcing panels.

16 Claims, 5 Drawing Sheets

(56) References Cited

U.S. PATENT DOCUMENTS

| | | |
|---|---|---|
| 2002/0020122 A1 | 2/2002 | Mueller |
| 2002/0038533 A1* | 4/2002 | Potter et al. .................... 52/634 |
| 2003/0041551 A1 | 3/2003 | Boone et al. |
| 2003/0042371 A1* | 3/2003 | McCahill et al. ............... 248/57 |
| 2003/0101675 A1 | 6/2003 | Wilson |
| 2003/0230042 A1 | 12/2003 | Rhodebeck et al. |
| 2004/0134140 A1 | 7/2004 | Gaddie et al. |
| 2006/0143998 A1* | 7/2006 | Timmerman et al. ........ 52/293.3 |

* cited by examiner

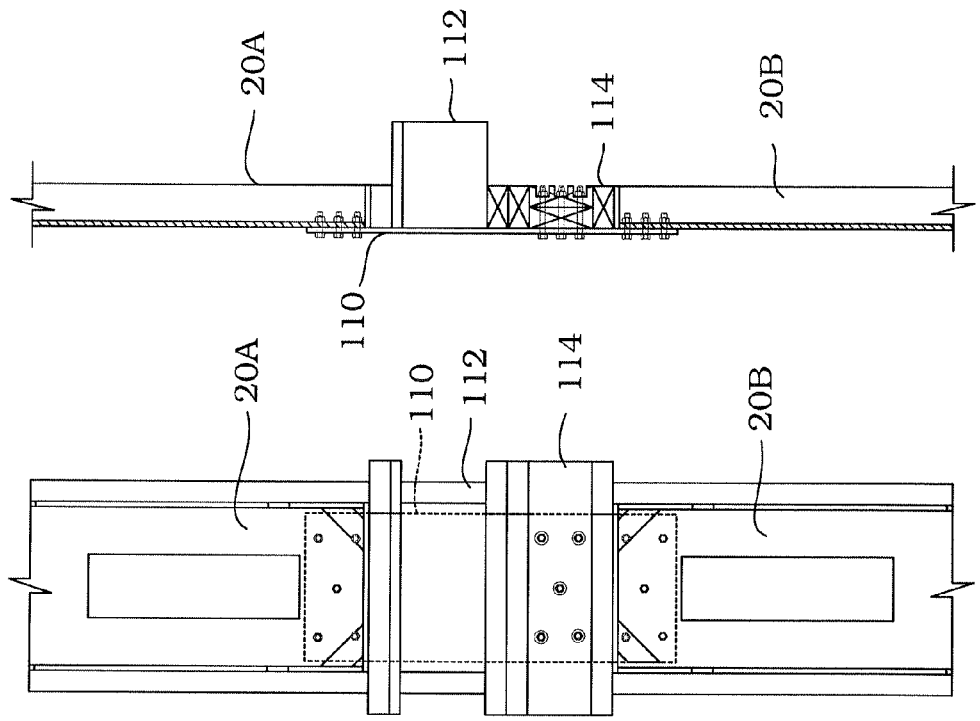
*Fig. 10*
*Fig. 9*
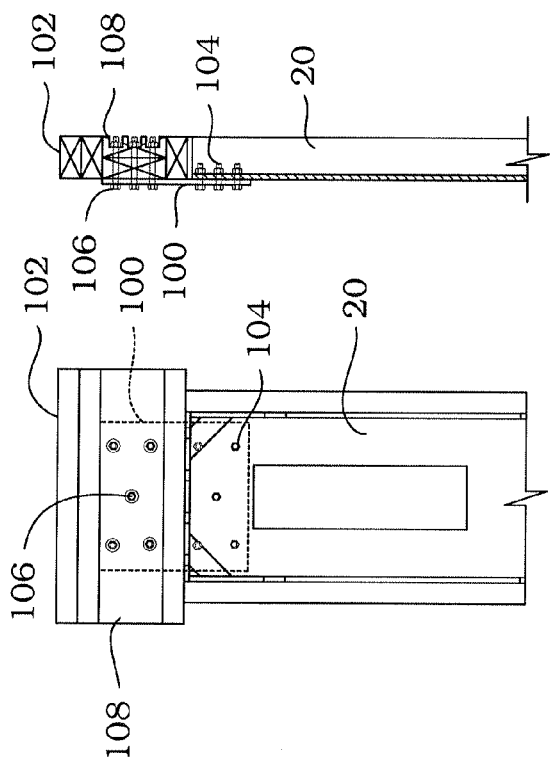
*Fig. 8*
*Fig. 7*

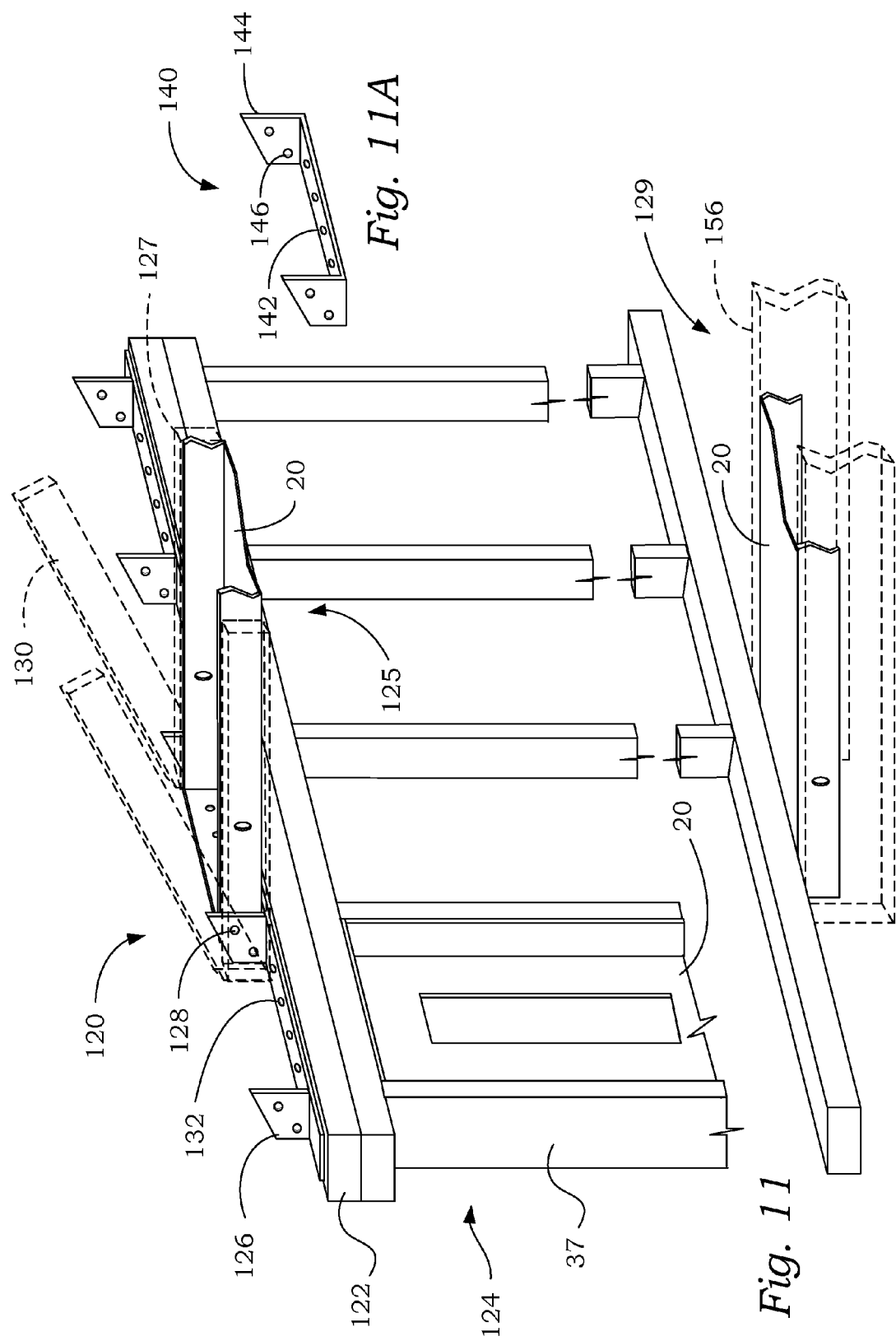

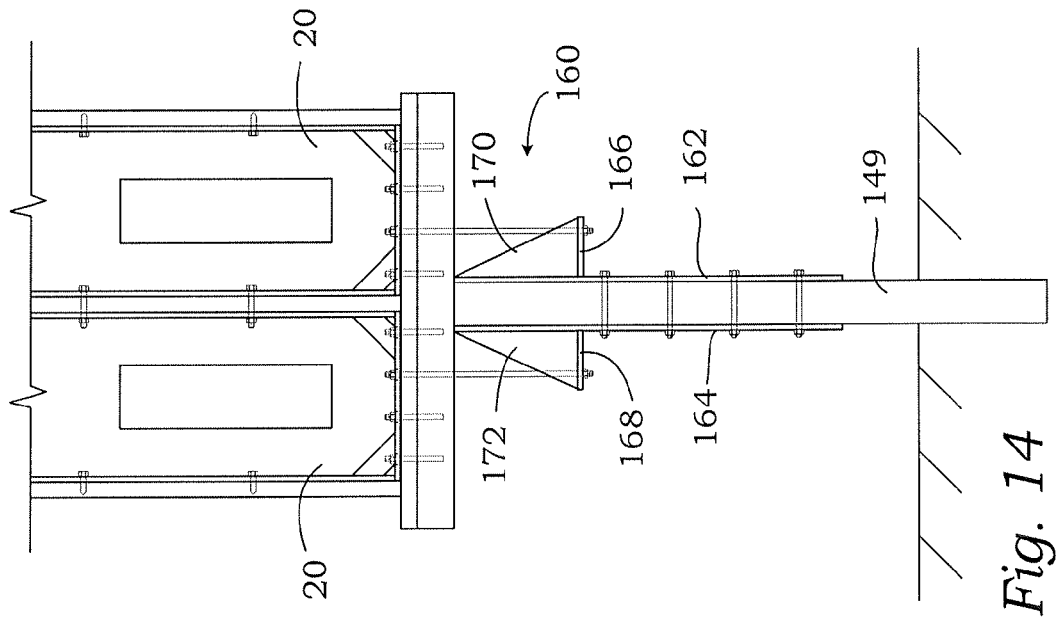
Fig. 14
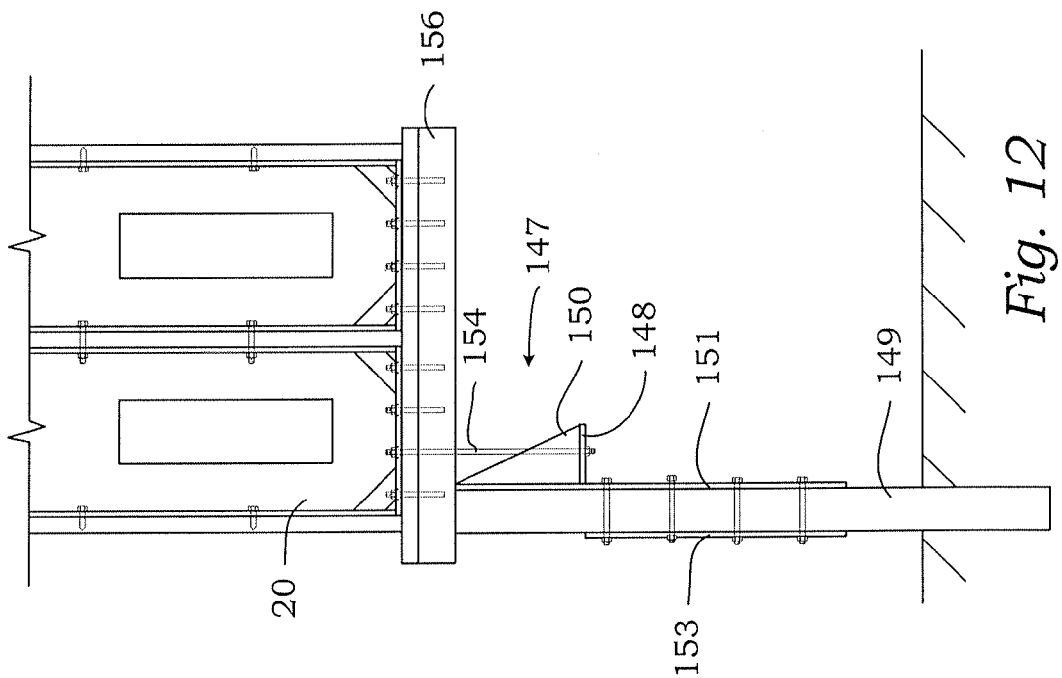
Fig. 13
Fig. 12

STRUCTURAL REINFORCING SYSTEM COMPONENTS

CROSS REFERENCE TO RELATED APPLICATION

This application is a continuation of U.S. Letters Pat. No. 8,327,592, issued Dec. 11, 2012, which claims the benefit of provisional application Ser. No. 60/706,195, filed Aug. 5, 2005, entitled STRUCTURAL REINFORCING SYSTEM COMPONENTS.

FIELD OF THE INVENTION

The present invention relates to structural components for buildings and, more particularly, to components of a structural reinforcing system for reducing the affects of shear and uplift forces on a building structure.

BACKGROUND OF THE INVENTION

The majority of the buildings in the United States are residential or low-rise commercial buildings consisting of a wood frame or light-steel frame structure with wood or composition sheathing. The structure is designed to withstand the anticipated loading conditions such as rain, snow and wind. Forces and loads such as gravity, rain and snow act vertically and typically are generally predictable. Accordingly, structural designs to withstand these forces are readily available.

Lateral or shear and uplift loads such as is caused by wind, storms, hurricanes and tornadoes are difficult to predict in direction, magnitude and frequency. In a conventional framed building construction, the vertical loads are handled by the frame including studs, joists, rafters, and trusses. The lateral shear loads are dealt with using sheathing attached to the frame. In areas that have a higher risk of severe weather, such as hurricanes along the East and Gulf coasts, two layers of sheathing may be required to withstand the increased potential loads along with rafter clips and cables to prevent the roof from detaching from the framed walls.

SUMMARY

The present invention includes structural reinforcing components to counter lateral shear loads and uplift forces. The components may be used separately or as a system to provide structural integrity as necessary. A structural reinforcing panel includes a back panel, side panels and upper and lower anchor plates. The side panels are fastened to the building structural frame members such as wall studs, ceiling and floor joists or to an adjacent structural reinforcing panel. The lower anchor plate is anchored to the top of a concrete basement wall, a concrete footing, or a pier mounting bracket, for example. The top anchor plate may be connected to the wall header, to another structural reinforcing panel or to a top plate truss mount. The top plate truss mount may include a top sill plate and a series of vertical straps connected to the rafters of the roof. The structural reinforcing panel may be mounted in the ceiling of a room in conjunction with panels mounted in the walls to provide a safe room within a wood-frame structure, for example.

BRIEF DESCRIPTION OF THE DRAWINGS

FIG. 7 is a partial front elevational view of a structural reinforcing panel and a panel mount.

FIG. 8 is a partial side cross sectional view of FIG. 7.

FIG. 9 is a partial front elevational view of two structural reinforcing panels and a floor-to-floor panel mount.

FIG. 10 is a partial side cross sectional view of FIG. 9.

FIG. 11 is a partial perspective view of the structural reinforcing panel and a top plate truss mount.

FIG. 11A is a perspective view of a top plate truss mount bracket.

FIG. 12 is a partial front elevational view of a structural reinforcing panel and a single pier mount.

FIG. 13 is a side view of the single pier mount of FIG. 12.

FIG. 14 is a partial front elevational view of a structural reinforcing panel and a double pier mount.

DETAILED DESCRIPTION

Figures 1, 2, 3:
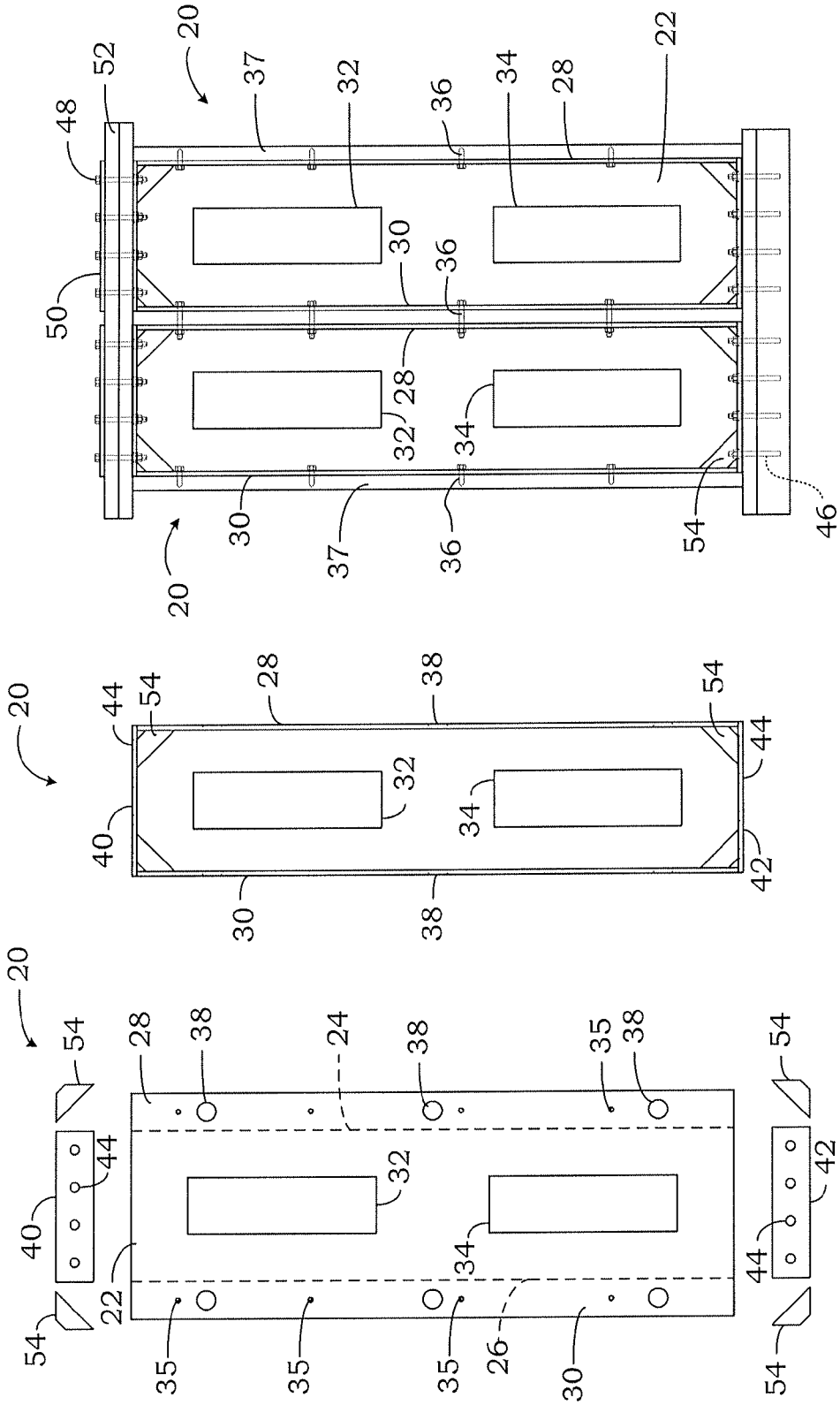
FIG. 1 is a plan view of the structural reinforcing panel of the present invention prior to assembly.
FIG. 2 is a front elevation view of the structural reinforcing panel of FIG. 1 formed and assembled.
FIG. 3 is a front elevational view of the structural reinforcing panel of FIG. 2 mounted between two wall studs.

Referring to FIGS. 1-4, a structural reinforcing panel is generally indicated by reference numeral 20. Structural reinforcing panel 20 may be assembled from the various parts shown in FIG. 1 formed in part from cold or hot rolled steel. Structural reinforcing panel 20 includes a back panel 22 which is folded along lines 24 and 26 to form side panels 28 and 30 to form a tray or channel. The back panel 22 has two cutouts 32 and 34 which reduce the weight of the structural reinforcing panel 20, make it easier to carry, and the removed material can be used to fabricate the additional components.

The sides 28 and 30 include a plurality of holes (not shown) for fasteners 36 to attach the panel 20 to framing members 37 or to other panels. When attaching to framing members 37, lag bolts may be used, for example. When attaching to other panels 20, a machine bolt and nut may be used. Cut outs 38 are also provided in sides 28 and 30 for mechanical access such as electrical or plumbing.

Upper 40 and lower 42 anchor plates are preferably welded to the top and bottom of back panel 22 and sides 28 and 30. The anchor plates 40 and 42 include a plurality of holes 44 to permit the panel to be secured in place with anchor bolts 46 and 48. A top plate 50 may be included along the top of the sill plate 52.

Corner gussets 54 may be placed along the front edges of the panel 20 and welded to the anchor plates 40 and 42 and the side panels 28 and 30 to reinforce the panel 20 and limit deflections.

The completed panel 20 may be left as uncoated metal or may be painted or otherwise coated. The panel 20 may be made from ¼" to ½" steel plate.

A safe room may be constructed by installing structural reinforcing panels 20 between each of the framing members 37 of a room. In the preferred embodiment for a safe room, the back panel 22 is solid with no cutouts to prevent projectiles from traveling through the wall and cutout. The panels 20 may be installed in the walls and ceiling, preferably on the first floor of a structure. The ceiling panels may be bolted directly to the header or top plate of the wall. The ceiling panels may be fabricated to span the width of the room. Alternatively, two or more panels 20 may be bolted together end-to-end to span the width of the room.

Figure 5:
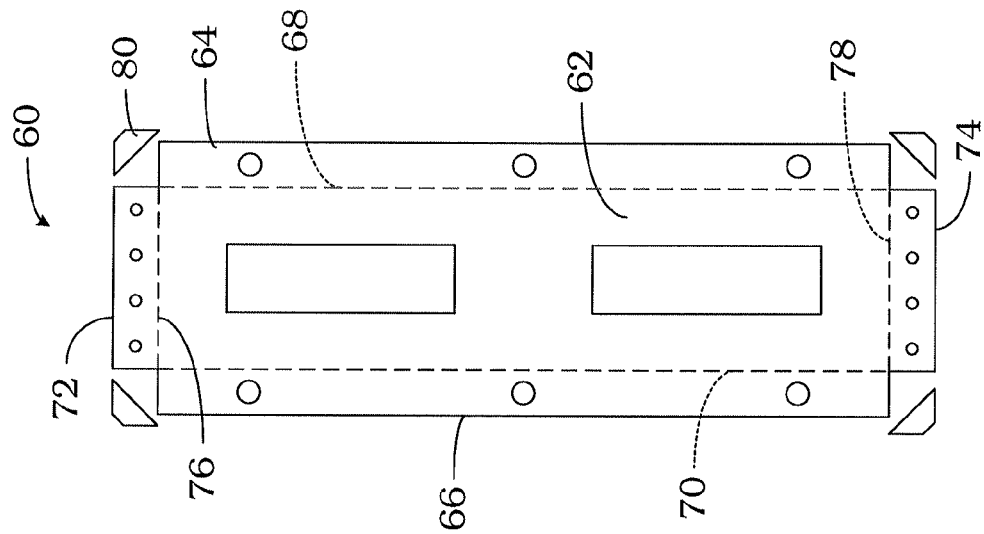
FIG. 5 is a plan view of another embodiment of the structural reinforcing panel of the present invention prior to assembly.
Figure 4:
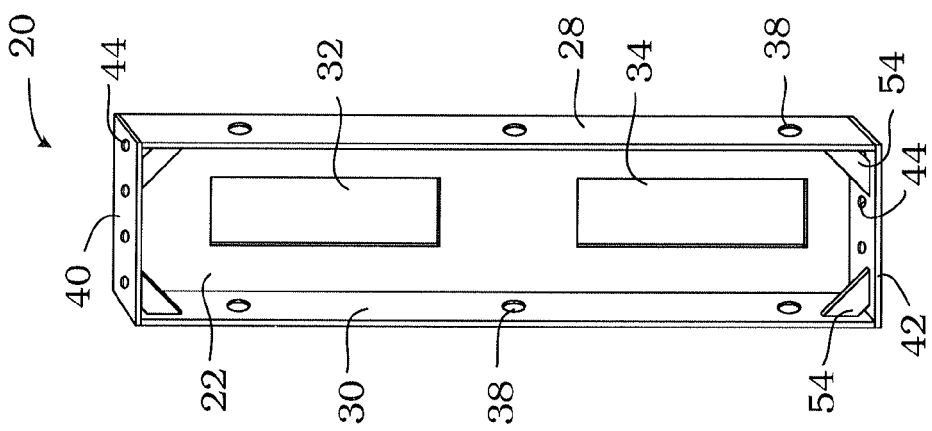
FIG. 4 is a perspective view of the structural reinforcing panel of FIG. 2.

Referring to FIG. 5, another embodiment of a structural reinforcing panel is generally indicated by reference numeral 60. Panel 60 includes a back plate 62, side panels 64 and 66 formed by folding the back panel 62 along fold lines 68 and 70, and anchor panels 72 and 74 formed by folding back panel 62 along fold lines 76 and 78. The anchor panels 72 and 74 are then welded along the corner intersections with side panels 64 and 66. Corner gussets 80 are welded into the corners of the panel 60 to provide additional lateral stability and strength.

Figure 6:
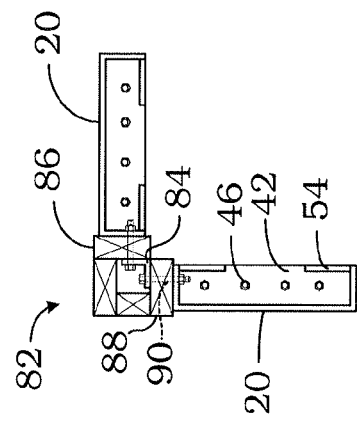
FIG. 6 is a top cross sectional view of a corner installation of two structural reinforcing panels.

Referring to FIG. 6, two structural reinforcing panels 20 may be connected together in a corner 82 to reinforce the corner of the structure. A length of angle iron 84 is positioned behind the corner studs 86 and 88. Bolts 90 extend through apertures in the angle iron 84 through apertures in the studs 86 and 88 and panels 20. Once the bolts 90 are tightened, the panels 20 form a rigid structurally reinforced corner which provides both uplift and lateral sheer strength to the structure.

Referring to FIGS. 7 and 8, a panel mount 100 may be used to secure structural reinforcing panel 20 to the building structure 102 when anchoring through the sill plate is not possible (See FIG. 3). Panel mount 100 is a steel plate with holes for bolts 104 and 106. Bolts 104 connect the panel mount 100 to panel 20. Bolts 106 secure the panel mount 100 to the header 108. The panel mount 100 may be installed at either the top or bottom of the structural reinforcing panel 20 as needed.

Referring to FIGS. 9 and 10, an extended panel mount 110 may be used to secure structural reinforcing panels 20A and 20B between a floor 112. The extended panel mount 110 is bolted to the top portion of one structural reinforcing panel 20A, to the header 114 and to the lower portion of the upper structural reinforcing panel 20B.

Referring to FIGS. 11 and 11A, a top plate truss mount is generally indicated by reference numeral 120. Top plate truss mount 120 is placed on the top plate 122 of wall 124. Top plate truss mount 120 includes a series of spaced apart vertical straps 126 with apertures 128. The vertical straps 126 may be spaced according to the required truss 130 spacing. The truss 130 is bolted or otherwise fastened to the vertical straps 126 through apertures 128. Top plate truss mount 120 also includes a plurality of apertures 132, which are aligned with the apertures 44 (see FIGS. 1, 3 and 4) in panel 20. The top plate truss mount 120 is bolted to the structural reinforcing panel 20 and may also be fastened to the top plate 122 to prevent uplift of the roof under high wind conditions.

One or more brackets 140 may be used along the top plate to secure the truss 130 to the top plate 122 of wall 124. Top plate truss mount bracket 140 includes a plurality of apertures 142, which are aligned with the apertures 44 (see FIGS. 1, 3 and 4) in panel 20. The truss 130 is bolted or otherwise fastened to the vertical straps 144 through apertures 146. The top plate truss mount bracket 140 is fastened to the structural reinforcing panel 20 and top plate 122 to prevent uplift of the roof under high wind conditions.

The structural reinforcing panels 20 may be used individually in a wall or may be used as multiples depending on the lateral shear and uplift requirements of the structure. By connecting two or more panels 20 together the lateral shear and uplift loads that the structure can handle is greatly increased. The panel 20 may be sized to fit within the spacing of the frame members in both width and height.

Installation of the structural reinforcing panels 20 in a single or multi-story structure reduces the need for additional sheathing and other bracing materials needed to build in various code municipalities and can increase the shear and uplift values from 35% to 96% depending on the number of panels 20 used.

Referring to FIGS. 12 and 13, a pier mount plate 147 may be used to anchor the structure reinforcing panel 20 to a pier 149. The pier mount plate 147 includes a front plate 151, a back plate 153, a bottom plate 148 and a pair of gussets 150 and 152. Bottom plate 148 and gussets 150 and 152 are welded together and then welded to front plate 144. The front 151 and back 153 plates are bolted to the pier 149. An anchor bolt or threaded rod 154 extends from a structural reinforcing panel 20 through the floor joist 156 to the bottom plate 148.

Referring to FIG. 14, a double pier mount plate 160 may be used to anchor two structural reinforcing panels 20 to a pier 149. The double pier mount plate 160 includes opposed plates 162 and 164 each having a bottom plate 166 and 168 and a pair of gussets 170 and 172.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is as follows:

1. In combination with a building having a wood-frame structure comprising spaced-apart studs, at least one sill plate, at least one footing, and a plurality of spaced-apart ceiling and floor joists, at least one structural reinforcing panel comprising:
   a rectangular back panel having a top, bottom, longitudinal sides and at least one cutout,
   a pair of rectangular side panels each having a longitudinal edge, said pair of rectangular side panels each attached along said longitudinal edge to one of said longitudinal sides of said rectangular back panel,
   an first anchor plate secured to said top of said rectangular back panel and a top edge of each of said pair of rectangular side panels,
   a second anchor plate secured to said bottom of said rectangular back panel and a bottom edge of each of said pair of rectangular side panels forming an open upright box,
   each of said rectangular side panels having a plurality of apertures receiving fasteners therethrough securing said at least one structural reinforcing panel to the wood-frame structure,
   one or more cutouts for utility access in each of said pair of rectangular side panels,
   said first anchor plate having a plurality of apertures receiving fasteners therethrough
   said second anchor plate having a plurality of apertures receiving fasteners therethrough, and
   first and second pairs of gussets secured in opposing upper and lower corners of said open upright box to reinforce said upright box,
   wherein said at least one structural reinforcing panel is constructed of steel plate,
   wherein said at least one structural reinforcing panel forms an open rectangular box, and
   wherein said at least one structural reinforcing panel is adapted to be fitted between and fastened to a pair of said plurality of spaced-apart ceiling joists, and first and second sill plates of the building thereby increasing the shear force and uplift force load values for the building.

2. The combination set forth in claim 1 wherein said at least one structural reinforcing panel presents a first structural reinforcing panel and further comprising a plurality of structural reinforcing panels secured between a plurality of pairs of said plurality of spaced-apart ceiling joists and said at least one sill plate of the building.

3. The combination set forth in claim 1 wherein said at least one structural reinforcing panel presents a first structural reinforcing panel and further comprising a plurality of structural reinforcing panels secured between a plurality of pairs of said plurality of spaced-apart floor joists and footings of the building.

4. The combination set forth in claim 1 wherein said at least one structural reinforcing panel presents a first structural reinforcing panel and further comprising a second structural reinforcing panel secured between a pair of said spaced-apart studs, said at least one sill plate and said at least one footing of the building.

5. The combination set forth in claim 4 wherein said at least one structural reinforcing panel comprises a plurality of structural reinforcing panels secured between a plurality of pairs of said spaced-apart studs, said at least one sill plate and said at least one footing of the building.

6. The combination set forth in claim 1 wherein said at least one structural reinforcing panel presents a first structural reinforcing panel and further comprising a first plurality of structural reinforcing panels secured between a plurality of pairs of said spaced-apart studs, said at least one sill plate and said at least one footing, a second plurality of structural reinforcing panels secured between said plurality of ceiling joists and said at least one sill plate, and a third plurality of structural reinforcing panels secured between said plurality of floor joists and said at least one footing of the building.

7. The combination set forth in claim 6 wherein said shear force and uplift force load values for the building are increased between 35% and 96%.

8. In combination with a building having a wood-frame structure comprising spaced-apart studs, at least one sill plate, at least one footing, and a plurality of spaced-apart ceiling and floor joists, and a roof with at least one rafter, at least one structural reinforcing panel comprising:
a rectangular back panel having a top, bottom, longitudinal sides and at least one cutout,
a pair of rectangular side panels each having a longitudinal edge, said pair of rectangular side panels each attached along said longitudinal edge to one of said longitudinal sides of said rectangular back panel,
a first anchor plate secured to said top of said rectangular back panel and a top edge of each of said pair of rectangular side panels,
a second anchor plate secured to said bottom of said rectangular back panel and a bottom edge of each of said pair of rectangular side panels forming an open upright box,
each of said rectangular side panels having a plurality of apertures receiving fasteners therethrough securing said at least one structural reinforcing panel to the wood-frame structure,
one or more cutouts for utility access in each of said pair of rectangular side panels,
said first anchor plate having a plurality of apertures receiving fasteners therethrough securing said at least one structural reinforcing panel to the wood-frame structure,
said second anchor plate having a plurality of apertures receiving fasteners therethrough securing said at least one structural reinforcing panel to the wood-frame structure,
first and second pairs of gussets secured in opposing upper and lower corners of said open upright box to reinforce said upright box,
a top plate truss mount bracket having a plurality of apertures receiving fasteners therethrough securing the top plate truss mount bracket to a first sill plate of said at least one sill plate of the wood-frame structure and to the plurality of roof rafters,
wherein said at least one structural reinforcing panel is constructed of steel plate,
wherein said at least one structural reinforcing panel forms an open rectangular box, and
wherein said at least one structural reinforcing panel is adapted to be fitted between and fastened to a pair of said plurality of spaced-apart ceiling joists, and said first sill plate and a second sill plate of said at least one sill plate of the wood-frame structure thereby increasing the shear force and uplift force load values for the building.

9. The combination set forth in claim 8 wherein said at least one structural reinforcing panel presents a first structural reinforcing panel and further comprising a plurality of structural reinforcing panels secured between a plurality of pairs of said plurality of spaced-apart ceiling joists and said at least one sill plate of the building.

10. The combination set forth in claim 8 wherein said at least one structural reinforcing panel presents a first structural reinforcing panel and further comprising a plurality of structural reinforcing panels secured between a plurality of pairs of said plurality of spaced-apart floor joists and said at least one footing of the building.

11. The combination set forth in claim 8 wherein said at least one structural reinforcing panel presents a first structural reinforcing panel and further comprising a second structural reinforcing panel secured between a pair of said spaced-apart studs, said at least one sill plate and said at least one footing of the building.

12. The combination set forth in claim 11 wherein said at least one structural reinforcing panel comprises a plurality of structural reinforcing panels secured between a plurality of pairs of said spaced-apart studs, said at least one sill plate and said at least one footing of the building.

13. The combination set forth in claim 11 further comprising a plurality of said top plate truss mounted brackets secured between a plurality said at least one sill plates and said plurality of rafters of the building.

14. The combination set forth in claim 13 wherein said shear force and uplift force load values for the building are increased between 35% and 96%.

15. The combination set forth in claim 8 wherein said at least one structural reinforcing panel presents a first structural reinforcing panel and further comprising a first plurality of structural reinforcing panels secured between a plurality of pairs of said spaced-apart studs, said at least one sill plate and said at least one footing, a second plurality of structural reinforcing panels secured between said plurality of ceiling joists and said at least one sill plate, and a third plurality of structural reinforcing panels secured between plurality of floor joists and said at least one footing of the building.

16. In combination with a building having a wood-frame structure comprising spaced-apart studs, at least one sill plate, at least one footing, and a plurality of spaced-apart ceiling and floor joists, and a roof with at least one rafter, at least one structural reinforcing panel comprising:
a rectangular back panel having a top, bottom, longitudinal sides and at least one cutout,
a pair of rectangular side panels each having a longitudinal edge, said pair of rectangular side panels each attached along said longitudinal edge to one of said longitudinal sides of said rectangular back panel, an first anchor plate secured to said top of said rectangular back panel and a top edge of each of said pair of rectangular side panels,
a second anchor plate secured to said bottom of said rectangular back panel and a bottom edge of each of said pair of rectangular side panels forming an open upright box,
each of said rectangular side panels having a plurality of apertures receiving fasteners therethrough securing said at least one structural reinforcing panel to a the wood-frame structure,
one or more cutouts for utility access in each of said pair of rectangular side panels,
said first anchor plate having a plurality of apertures receiving fasteners therethrough,
said second anchor plate having a plurality of apertures receiving fasteners therethrough,
first and second pairs of gussets secured in opposing upper and lower corners of said open upright box to reinforce said upright box,
a top plate truss mount bracket having a plurality of apertures receiving fasteners therethrough,
wherein said at least one structural reinforcing panel is constructed of steel plate,
wherein said at least one structural reinforcing panel further comprises a first plurality of said structural reinforcing panels secured between pairs of said spaced-apart studs in the structure,
wherein said at least one structural reinforcing panel further comprises a second plurality of said structural reinforcing panels secured between pairs of said plurality of ceiling joists in the structure,
wherein said at least one structural reinforcing panel further comprises a third plurality of said structural reinforcing panels secured between pairs of said plurality of floor joists in the structure,
wherein each of said top plate truss mount brackets is secured to one of said at least one sill plate and said roof of the structure, and
wherein said first, second and third pluralities of structural reinforcing panels and each of said top plate truss mount brackets increase the shear force and uplift force load values for the structure.

* * * * *